(12) United States Patent
Lee

(10) Patent No.: US 7,559,683 B2
(45) Date of Patent: Jul. 14, 2009

(54) BACKLIGHT ASSEMBLY, LIGHT GUIDING PLATE INCLUDING PLURALITY OF DISCONTINUOUSLY FORMED PRISMS

(75) Inventor: Hea-Chun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 12 days.

(21) Appl. No.: 11/213,805

(22) Filed: Aug. 30, 2005

(65) Prior Publication Data

US 2006/0044837 A1    Mar. 2, 2006

(30) Foreign Application Priority Data

Aug. 30, 2004    (KR)    ............... 10-2004-0068408

(51) Int. Cl.
    *F21V 7/04*    (2006.01)
(52) U.S. Cl. ............... 362/620; 362/626; 362/606
(58) Field of Classification Search .......... 362/620, 362/626, 606
    See application file for complete search history.

(56) References Cited

U.S. PATENT DOCUMENTS 3,873,184 A * 3/1975 Heenan ............... 359/533
5,136,480 A * 8/1992 Pristash et al. ............... 362/618
5,349,503 A * 9/1994 Blonder et al. ............... 362/623
5,584,556 A * 12/1996 Yokoyama et al. .......... 362/625
5,600,455 A * 2/1997 Ishikawa et al. ............... 349/57
5,771,328 A * 6/1998 Wortman et al. ............ 385/146
5,980,054 A * 11/1999 Fukui et al. ................ 362/625
5,999,685 A * 12/1999 Goto et al. ................. 385/146
6,305,811 B1 * 10/2001 Beeson et al. ............... 362/626
6,454,452 B1 * 9/2002 Sasagawa et al. ............ 362/561
6,755,545 B2 * 6/2004 Lee ........................... 362/616
6,863,414 B2 * 3/2005 Ho ............................. 362/603
7,040,796 B2 * 5/2006 Sugiura et al. ............... 362/608
7,160,018 B2 * 1/2007 Chen et al. ................... 362/620
2002/0181223 A1 * 12/2002 Ryu et al. ....................... 362/31
2004/0125588 A1 * 7/2004 Ho ............................. 362/636
2004/0145915 A1 * 7/2004 Kim et al. .................... 362/559

FOREIGN PATENT DOCUMENTS

| CN | 2324556 Y | 6/1999 |
| CN | 1350198 A | 5/2002 |
| CN | 1517724 A | 8/2004 |

* cited by examiner

*Primary Examiner*—Ismael Negron
(74) *Attorney, Agent, or Firm*—Haynes and Boone, LLP

(57) ABSTRACT

A backlight assembly includes a light source for emitting light; and a light guiding plate for guiding the light emitted from the light source. A plurality of prisms is discontinuously formed on a surface of the light guiding plate in a longitudinal direction thereof.

28 Claims, 7 Drawing Sheets

BACKLIGHT ASSEMBLY, LIGHT GUIDING PLATE INCLUDING PLURALITY OF DISCONTINUOUSLY FORMED PRISMS

CROSS-REFERENCE TO RELATED APPLICATION

The present application claims priority to and the benefit of Korean Patent Application No. 10-2004-0068408, filed on Aug. 30, 2004, which is hereby incorporated by reference for all purposes as if fully set forth herein.

BACKGROUND OF THE INVENTION

1. Field of the Invention

The present invention relates to a backlight assembly provided with a light guiding plate ("LGP") and a display device provided with the backlight assembly, and more particularly, to a backlight assembly provided with a modified LGP capable of not using optical sheets and the display device provided with the backlight assembly.

2. Description of Related Art

Recently, due to developments in semiconductor technology, demand is increasing for small-sized and light-weight flat panel display having improved performance characteristics.

Among the flat panel displays, a liquid crystal display ("LCD") has a smaller size, a lighter weight, and consumes less power than existing cathode ray tubes (CRT). Due to these characteristics, LCDs are widely used with almost all information processing apparatuses that require display devices.

In a typical LCD, a molecular alignment of liquid crystal molecules is changed by applying a voltage thereto. Such changes in molecular alignment affect optical characteristics of a liquid crystal cell, such as birefringence, optical rotary power, dichroism, optical scattering, etc., are converted into a visual change. Thus, the typical LCD is a light-receiving type of display device that displays information using optical modulation of the liquid crystal cells.

A display device, such as an LCD, receives a light from a backlight assembly and displays an image on the display panel. The backlight assembly includes a lamp, an LGP, and a plurality of optical sheets. The LGP guides light emitted from the lamp through the optical sheets to improve brightness. The light with improved brightness is then supplied to the display panel.

Convention optical sheets of the backlight assembly include a diffusing sheet, two prism sheets, and a reflecting sheet. The diffusing sheet uniformly diffuses light passing through the LGP, and the prism sheets improve a viewing angle while improving brightness at the front side by gathering light. A reflecting sheet covers a plurality of prism shaped protrusions that are formed on the surface of the prism sheet.

Since a plurality of optical sheets are used in a display device, a number of processes for manufacturing and assembling the optical sheets are performed, which increases production cost. In particular, a small-sized device, such as a cellular phone or a notebook computer, which consumers want to be slim and light weight, is difficult to produce because a plurality of optical sheets cannot be used without increasing the width and/or weight of the device. Further, assembling a plurality of optical sheets together at once is difficult and light loss increases as the light passes through a plurality of optical sheets.

SUMMARY OF THE INVENTION

The present invention provides a backlight assembly including a light source for emitting light; and an LGP for guiding the light emitted from the light source. A plurality of prisms are discontinuously formed on a surface of the LGP along the longitudinal direction thereof.

Additional features of the invention will be set forth in the description which follows, and in part will be apparent from the description, or may be learned by practice of the invention.

The present invention discloses a backlight assembly, including a light source for emitting light; and a light guiding plate for guiding the light emitted from the light source; wherein a plurality of prisms are discontinuously arranged on a surface of the light guiding plate along the longitudinal direction.

The present invention also discloses a backlight assembly, including a light source for emitting light; and a light guiding plate for guiding the light emitted from the light source; wherein a plurality of prism units are arranged on a surface of the light guiding plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
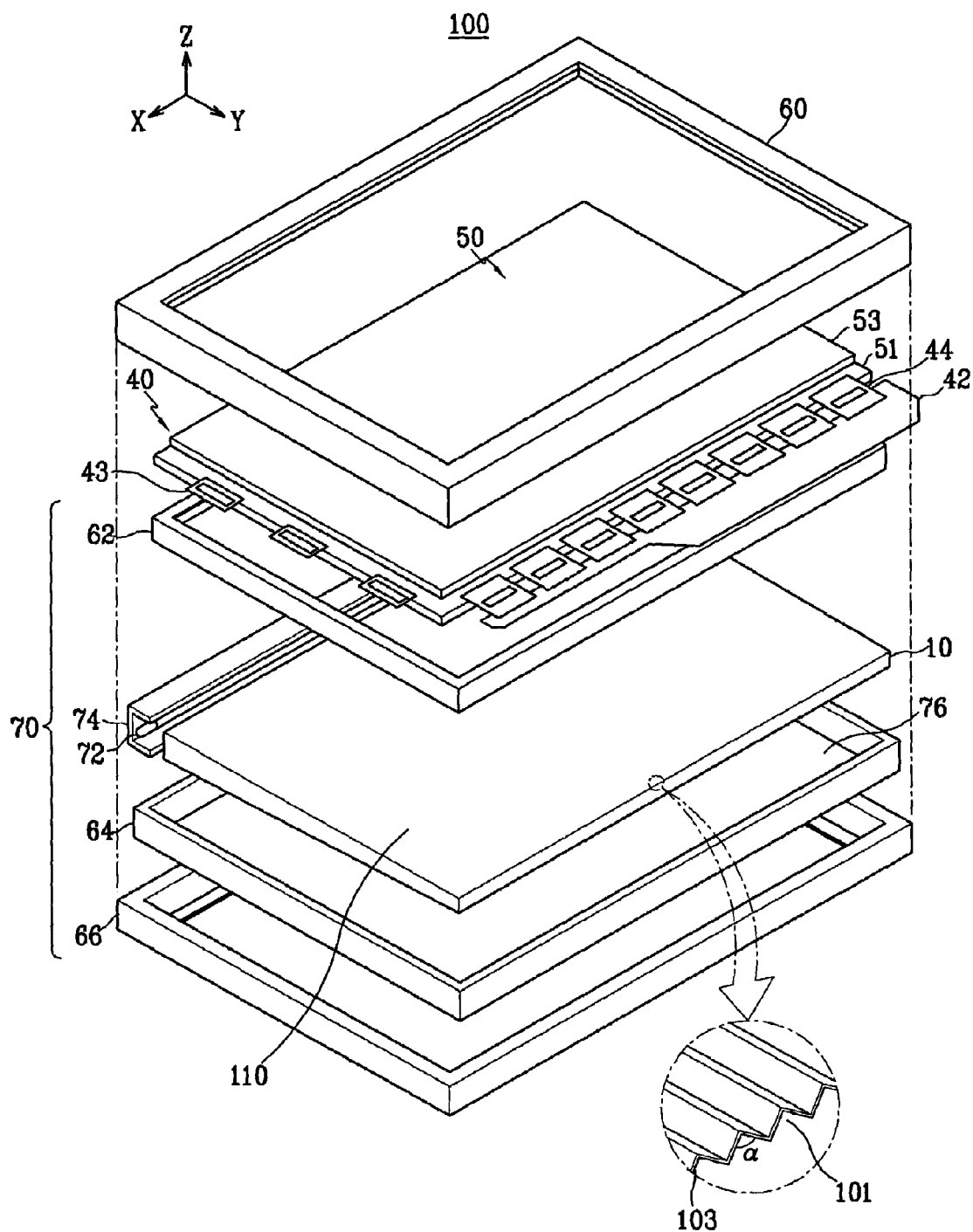
FIG. 1 is an exploded perspective view of a display device provided with a backlight assembly according to a first embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

Embodiments of the present invention are described below with reference to FIGS. 1, 2, 3, 4, 5 and 6. Such embodiments of the present invention are provided to illustrate the present invention, and the present invention is not limited to these embodiments.

FIG. 1 shows an exploded perspective view of a display device 100 provided without an optical sheet.

The display device 100 shown in FIG. 1 includes a backlight assembly 70 for supplying light and a panel unit 50 for displaying an image. The backlight assembly 70 and the panel unit 50 are attached together by a top chassis 60, which is assembled thereto. The backlight assembly 70 guides light and improves its brightness and then supplies the light to the panel unit 50. A panel unit assembly 40 may be provided on the backlight assembly 70 to control the panel unit 50 for displaying an image.

The panel unit assembly 40 includes a panel unit 50, a driver IC package 43 and 44, and a printed circuit board ("PCB") 42. For example, the driver IC package may be a tape carrier package (TCP) or a chip on film (COF).

The panel unit 50 displays an image thereon and includes at least one panel. For example, as shown in FIG. 1, the panel unit includes two panels 51 and 53. An LCD, which is a non-emissive display device, preferably includes two panels.

The panel unit 50 includes a TFT (thin film transistor) array panel 51 having a plurality of TFTs, a color filter panel 53 positioned opposite the TFT array panel 51, and a liquid crystal layer (not shown) arranged therebetween.

The TFT array panel 51 includes a transparent glass substrate and a plurality of pixel electrodes (not shown), a plurality of TFTs (not shown), and a plurality of signal lines (not shown) arranged on the substrate. The pixel electrodes are arranged in a matrix and may be made of a transparent conductor, such as indium tin oxide (ITO) or indium zinc oxide (IZO), or a reflective metal, such as Al and Ag. The signal lines includes gate lines (not shown) and data lines (not shown). Each TFT has a gate connected, e.g., coupled, with one of the gate lines, a source connected, e.g., coupled, with one of the data lines, and a drain connected, e.g., coupled, with one of the pixel electrodes.

The data lines and the gate lines of the panel unit 50 are connected, e.g., coupled, with the PCB 42, and the data lines and gate lines receive data signals and gate signals, respectively, therefrom. The TFTs are turned on or turned off according to the gate signals from the gate lines to selectively transmit the data signals to the pixel electrodes.

In addition, the color filter panel 53 includes a plurality of color filters (not shown) facing the pixel electrodes, and a common electrode (not shown), which may be made of a transparent conductor such as ITO or IZO, that covers the entire surface of the color filter panel 53. The common electrode is supplied with a common voltage, and a voltage difference between the pixel electrode and the common electrode generates an electric field in the liquid crystal layer. The electric field determines orientations of liquid crystal molecules in the liquid crystal layer and thereby determines the transmittance of light passing through the liquid crystal layer. The driver IC packages 43 and 44 transmit a plurality of control signals for controlling the panel unit 50. The data driver IC package 44 is connected, e.g., coupled, with the plurality of data lines provided on the panel unit 50, and the gate driver IC package 43 is connected, e.g., coupled, with the plurality of gate lines provided on the panel unit 50.

The backlight assembly 70 is provided below the panel unit assembly 40 in order to provide substantially uniform light to the panel unit 50.

The backlight assembly 70 is fixed, e.g., held together, by an upper mold frame 62 and a lower mold frame 66. The backlight assembly 70 may include a light source 72 for emitting light, an LGP 10 for guiding the light emitted from the light source 72 to the panel unit 50, a reflecting sheet 76 positioned under the LGP 10 to reflect the light emitted from the light source 72, and a light source cover 74 which covers and protects the light source 72. The backlight assembly 70 elements are received, e.g., contained, in a bottom chassis 64.

Although the lamp is shown as a light source in FIG. 1, the lamp is merely one example of the light source and the present invention is not limited thereto. For example, a light source may include a plurality of light emitting diodes.

The PCB 42 is located between the top chassis 60 and the lower mold frame 66. The PCB 42 is disposed on the bottom chassis 64.

An inverter (not shown) for supplying electric power to the light source 72 and the control board (not shown) may be provided at a rear side of the bottom chassis 64. The inverter transforms external power to a constant voltage level, and then provides such power to the light source 72. The control board converts analog data into digital data and provides the digital data to the panel unit 50. The inverter and the control board are protected by a shield case (not shown) that covers them.

As shown in FIG. 1, the display device 100 does not include optical sheets. Therefore, the panel unit 50 and the LGP 10 directly face each other. Due to such a configuration, the light passing through the LGP 10 may be directly supplied to the panel unit 40 without passing through other elements, thereby minimizing the loss of light and increasing brightness. The modified LGP is discussed below with reference to the enlarged circle of FIG. 1.

The enlarged circle of FIG. 1 shows an edge portion of the light emitting surface 110 of the LGP 10. A plurality of prisms 101 may be formed on the light emitting surface 110 of the LGP 10, and they may be arranged along a single direction. In FIG. 1, although the plurality of prisms 101 are formed along the Y-axis direction, which is substantially perpendicular to the longitudinal direction of the light source 72, the present invention is not limited thereto. For example, a plurality of prisms may be formed in another direction.

The prisms 101 formed on the LGP 10 function substantially the same as the prism sheet, which is included in optical sheets of a conventional display device. Namely, prisms 101 are formed on the light emitting surface 110 of the LGP 10, and thereby light is focused when the light is substantially vertically emitted from the light emitting surface 110 of the LGP 10. In doing so, brightness is improved and the display device displays a clearer image than the conventional display device.

The vertical angle α of the prisms 101 is preferably substantially a right angle, so that the effect of focusing light is maximized, which improves brightness.

A protection film 103 may be coated on the prisms 101 that are formed on the light emitting surface 110 of the LGP 10 to prevent the prisms 101 from being damaged. The protection film 103 functions the same as the protection sheet included in the optical sheet. The protection film 103 may be made of a resin such as PMMA (polymethylmethacrylate), thereby effectively protecting the prisms 101.

Figure 2:
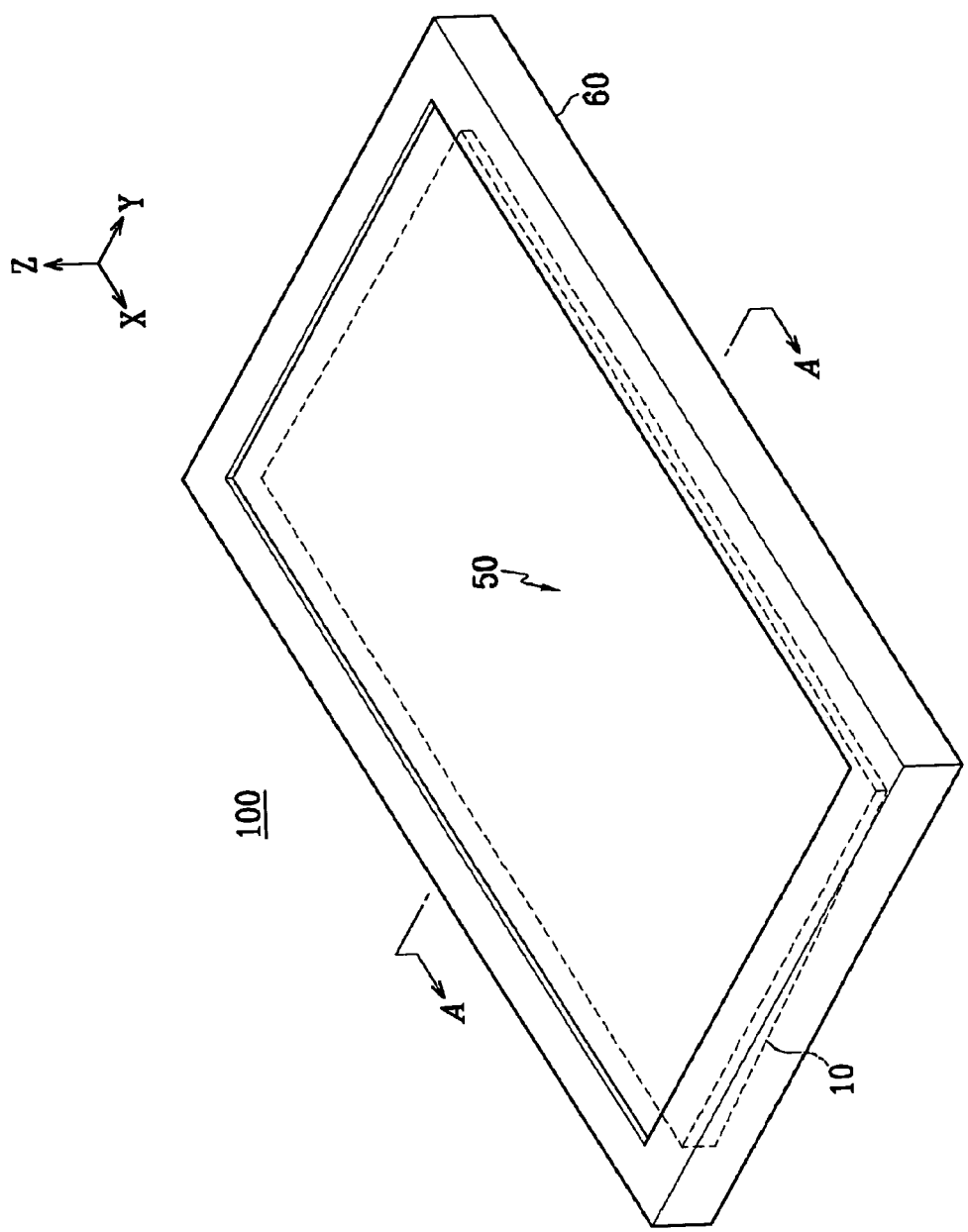
FIG. 2 is an assembled perspective view of a display device provided with a backlight assembly according to the first embodiment.

FIG. 2 is an assembled view of the display device 100 shown in FIG. 1.

Since the LGP (dotted line) 10 included in the display device 100 provides essentially the same function as an optical sheet, the display device 100 may be slimmer and lighter then a conventional LCD. Namely, since the optical sheets are not included in the display device 100, the thickness of the display device 100 decreases by about 0.5 mm and its weight decreases by about 30 g. Therefore, the present invention may be applied to a portable notebook or other small device.

Figure 3:
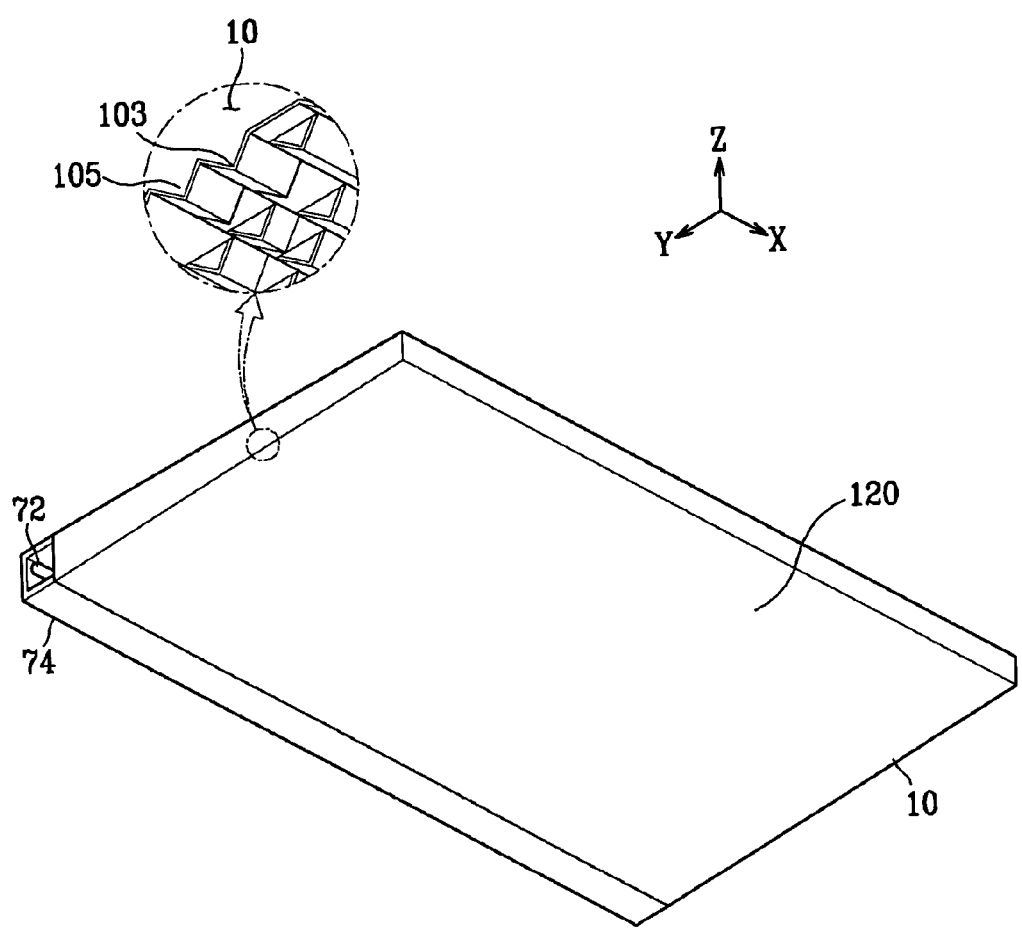
FIG. 3 is a rear perspective view of the LGP provided in a backlight assembly according to the first embodiment.

FIG. 3 shows a rear side of the LGP 10. The LGP 10 includes a light source 72 and a light source cover 74.

Since the plurality of prisms 105 are discontinuously formed on the surface facing the light emitting surface 120, the LGP 10 more effectively gathers light. For example, as shown in FIG. 3, the plurality of prisms 105 may be cut partly in several places.

Returning to FIG. 1, the prisms may be formed along the Y-axis direction on the light emitting surface of the LGP 10. Therefore, the prisms formed on the light emitting surface 110 three-dimensionally cross the plurality of prisms 105 formed on the bottom surface 120. The angle between the prisms formed on the light emitting surface 110 of the LGP 10 and prisms 105 formed on the bottom surface 120 of the LGP 10 is a substantially vertical angle. The bottom surface 120 of the LGP 10 faces the light emitting surface 110 shown in FIG. 1. The light is substantially vertically directed from the plurality of prisms 105 formed on the bottom surface 120 to the plurality of prisms formed on the light emitting surface. The light emitted from the bottom surface 120 is gathered by the plurality of prisms formed on the light emitting surface and emitted to the panel unit, which improves the brightness of the light.

A protection film 103 may be coated on the prisms 105 to prevent or substantially prevent damage thereto. The protection film 103 may be made of a resin such as PMMA (polymethylmethacrylate). Although FIG. 3 shows the prisms 105 coated with a protection film 103, the protection film is not necessary.

A total reflection angle of the light emitted from the light source 72 to the LGP 10 is maintained at about 42° to about 45°. Preferably, the refection angle of the light emitted from the light source 72 is maintained at about 43°, thereby the light may be vertically emitted to the light emitting surface of the LGP 10. The path of the light emitted from a light source 72 is described below with reference to FIG. 4.

Figure 4:
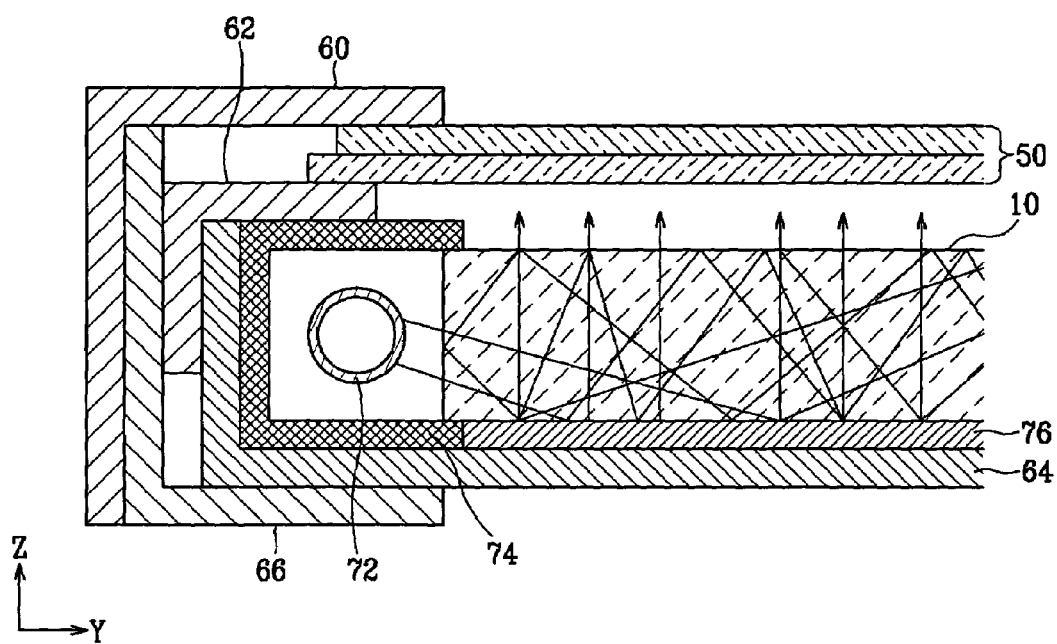
FIG. 4 is a cross-sectional view taken along Line AA of FIG. 2.

In FIG. 4, the path of light is drawn with a plurality of arrows. The light emitted from the light source 72 passes through the LGP 10. Since the plurality of prisms are finely formed on the surface of the LGP 10, they are omitted in FIG. 4 for purposes of convenience.

The light emitted from the light source 72 is transmitted to the bottom surface of the LGP 10 where a reflecting sheet 76 reflects a portion of the light. In addition, due to the plurality of prisms provided on the bottom surface of the LGP 10, some of the light is totally reflected in the LGP 10 and other light is substantially vertically transmitted to the light emitting surface of the LGP 10 and gathered by the prisms formed on the light emitting surface of the LGP 10 where it is then transmitted to the panel unit 50.

Since the LGP 10 and the panel unit 50 directly face each other, the light having an improved brightness may be supplied to the panel unit 50 without there being a loss of light. In particular, since a space for receiving optical sheets is not necessary due to the absence of the optical sheets, the manufacturing process is simplified and the original cost of the backlight assembly is decreased.

Figure 5:
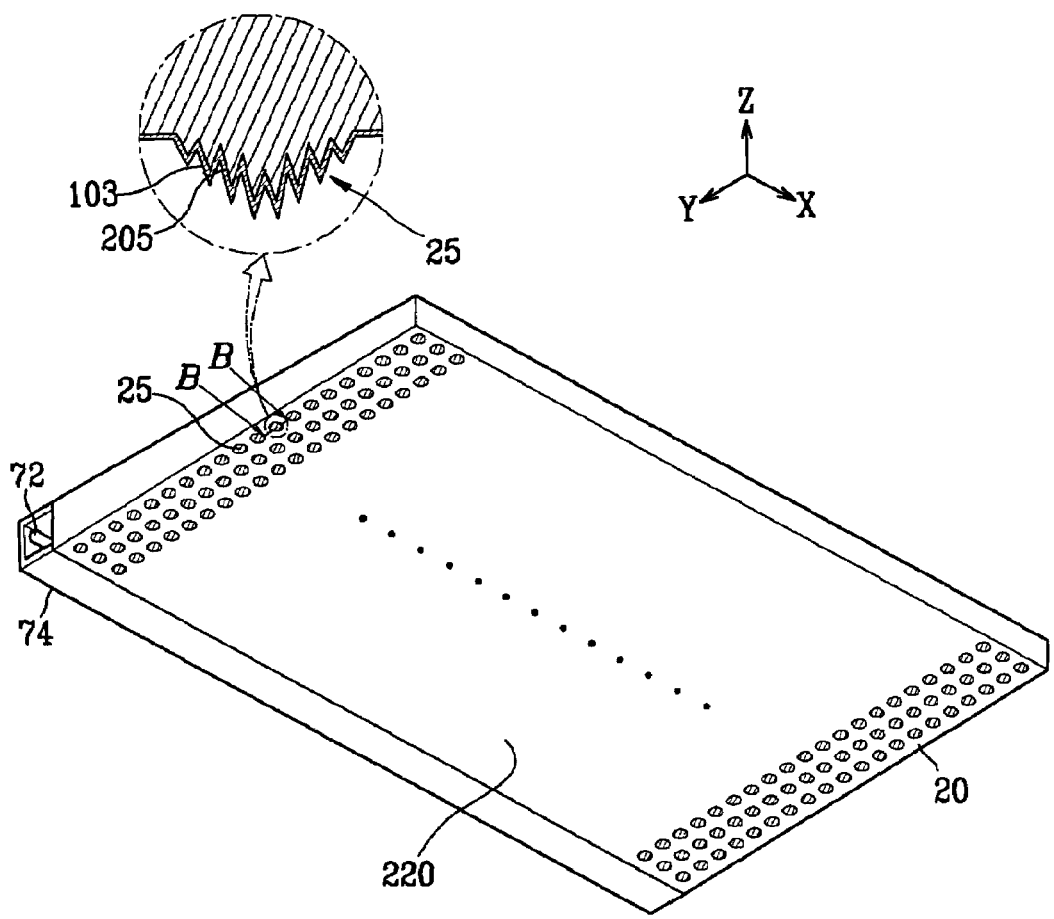
FIG. 5 is a rear perspective view of the LGP provided in a backlight assembly according to a second embodiment of the invention.

FIG. 5 shows a rear side of the LGP 20 included in a backlight assembly according to the second embodiment of the invention. A plurality of prism units 25 are discontinuously, e.g., non-uniformly, formed on the bottom surface 220 of the LGP 20. As shown in FIG. 5, the plurality of prism units 25 are separated from each other on the bottom surface 220 of the LGP 20.

The plurality of prisms 205 are arranged together to form a prism unit 25. A plurality of prism units 25 are formed on the bottom surface 220 of the LGP 20 and are separated from each other.

As the distance from the light source 72 increases, the amount of light emitted from the light source 72 and transmitted along Y-axis direction decreases. Therefore, it is preferable that the prism unit 25 is more densely formed as the distance from the light source 72 is increased so the light is reflected as much as possible to the light emitting surface 220.

Since the prism unit 25 is a substantially circular-like shape; e.g., a dot like shape, it is possible to improve the quality of the appearance of such as a bright line, light leakage in an oblique direction, and dark areas; and the uniformity of the brightness of the light due to the ease of controlling it.

The enlarged circle in FIG. 5 is a sectional view of the prism unit 25 along the line BB. In the prism unit 25, a plurality of prisms 205 with different heights are arranged. Alternatively, the prism unit 25 may be arranged with the height of each prism 205 being substantially the same.

The prism unit 25 may include a plurality of substantially circular like plates that are separately formed on the bottom surface 220 of the LGP 20. The substantially circular plates are then arranged to form a plurality of prisms 205 in the prism unit 25. The plurality of prisms 205 included in each prism unit 25 arranged on the surface facing the light emitting surface 220 of the LGP 20 are arranged along the X-direction. Since the plurality of prisms 205 formed on the light emitting surface of the LGP 20 may also be arranged along the Y-direction as shown in FIG. 1, the prisms 205 may three-dimensionally cross the plurality of prisms 205 included in each prism unit 25 formed on the bottom surface 220. The specific manufacturing method of the prism unit may be easily understood by one skilled in the art, therefore, a detailed explanation of the manufacturing method of the prism unit is not included herein for purposes of convenience.

The light emitted upon the bottom surface 220 of the LGP 20 is substantially uniformly diffused due to the arrangement of the prism unit 25 on the bottom surface 220 of the LGP 20. In addition, the brightness of the light is improved since the light is substantially vertically transmitted to the light emitting surface of the LGP 20.

Figure 6:
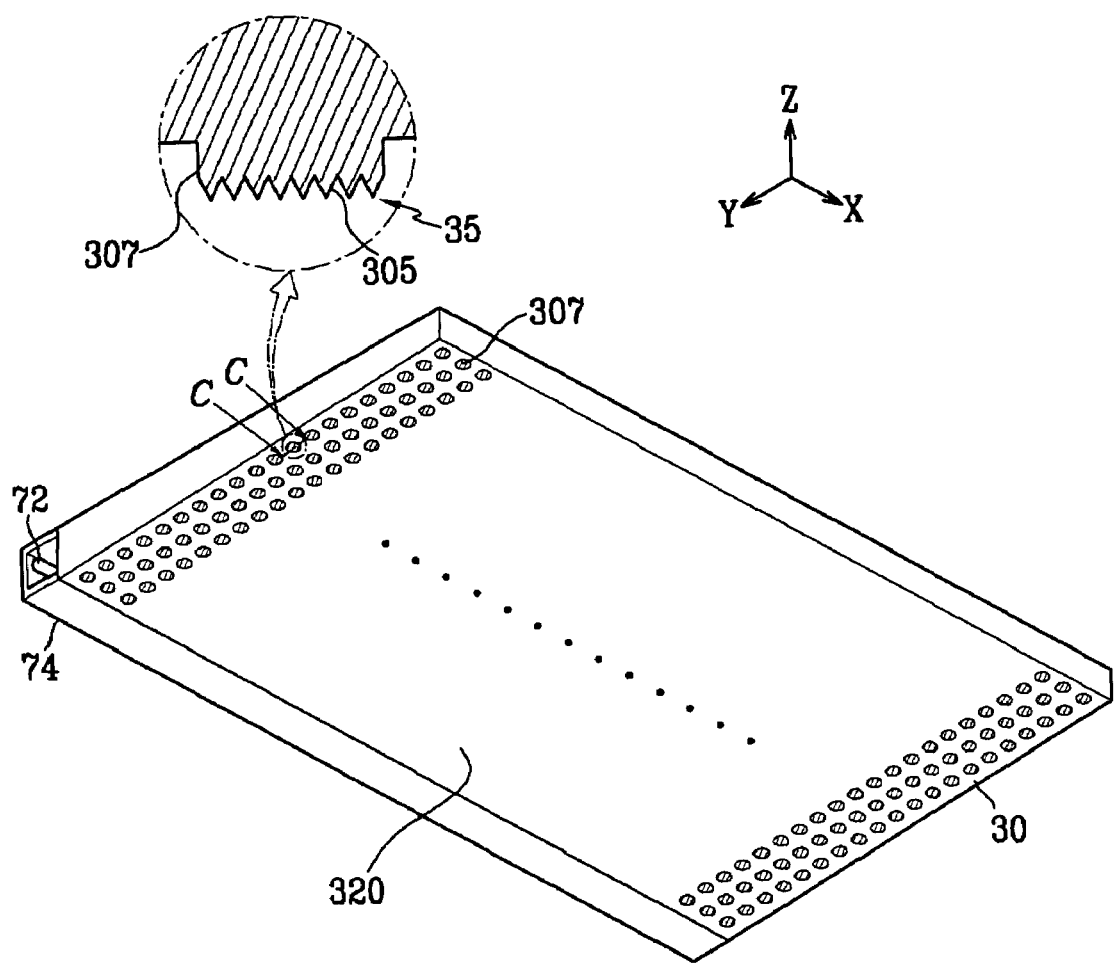
FIG. 6 is a rear perspective view of the LGP provided in a backlight assembly according to a third embodiment of the invention.

FIG. 6 shows a rear side of the LGP 30 included in a backlight assembly according to a third embodiment of the invention. A plurality of prism units 35 are arranged on the bottom surface 320 of the LGP 30.

The enlarged circle of FIG. 6 shows a sectional view of a prism unit 35 along the line CC. As shown in the enlarged circle of FIG. 6, a protruding plate 307 is arranged on the bottom surface 320 of the LGP 30 and each of the prism unit 35 is arranged thereon.

The plurality of protruding plates 307 are arranged to be separable from each other, and a plurality of prisms 305 are formed on each protruding plate 307 once the plurality of protruding plates 307 are arranged on the bottom surface 320 of the LGP 30. Therefore, the prism unit 35 may be easily manufactured. The specific manufacturing method of the prisms is easily understood by one skilled in the art, therefore, a detailed explanation of the manufacturing method of the prism is omitted for purposes of convenience.

The light emitted to the bottom surface 320 of the LGP 30 is substantially uniformly diffused due to the arrangement of the prisms 305 on the bottom surface 320 of the LGP 30. In addition, the brightness of the light is improved since the light is substantially vertically transmitted to the light emitting surface of the LGP 30.

Hereinafter, the present invention is described according to experimental examples. Such examples are only meant illustrate the present invention, and the invention is not limited thereto.

EXPERIMENTAL EXAMPLES

The experiments of the present invention relate to the backlight assembly according to the embodiments of the present invention. A profile of the light is acquired from experimental simulation of the present invention, and the specific conditions of the experimental simulation are merely conventional conditions which are easily understood by those skilled in the art, so a detailed description thereof is omitted for purposes of convenience.

Experimental Example 1

Figure 7A:
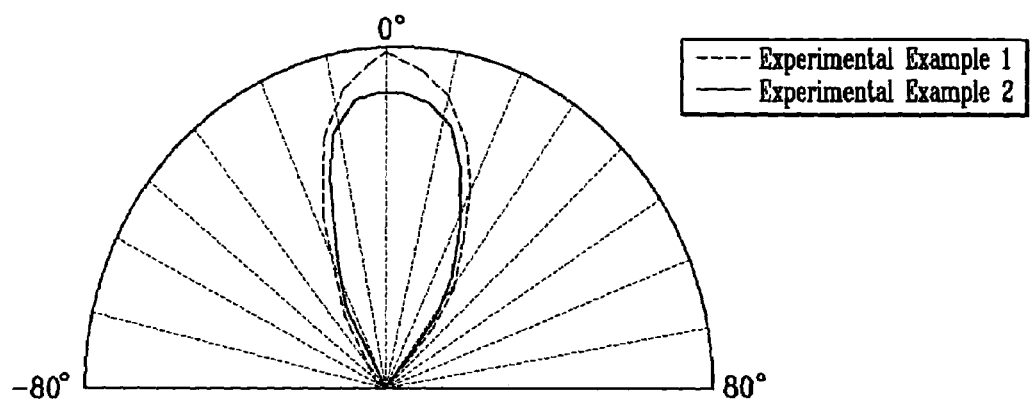
FIG. 7A and FIG. 7B are views of a light profile of the backlight assembly according to experimental examples of the present invention and comparative examples related to the conventional art, respectively.

The backlight assembly includes an LGP in which a prism without a protection film is irregularly arranged on a light emitting surface of the LGP. A profile of the light emitted from the backlight assembly was measured and the result is shown as a dotted line in FIG. 7A. As shown in FIG. 7A, the light is gathered on the front side and is emitted at an angle of about 0°. The brightness of the light was relatively high.

Experimental Example 2

The backlight assembly includes an LGP in which a plurality of prisms with a protection film are discontinuously, e.g., non-uniformly, arranged on the light emitting surface of the LGP. A profile of the light emitted from the backlight assembly was measured, and the result is shown as a solid line in FIG. 7A. As shown in FIG. 7A, the light is gathered on the front side and is emitted at an angle of about 0°. The brightness of the light according to Experimental Example 2 is lower than the brightness of the light according to Experimental Example 1 due to the protection film.

Comparative Examples

In the comparative examples, the experiment is applied to a backlight assembly provided with optical sheets and a conventional LGP. The profile of light is acquired from experimental simulations. Since the conditions of experimental simulation are the same as those of the experimental examples of the present invention, a detailed description thereof is omitted.

Hereinafter, the comparative examples will be explained in detail.

Comparative Example 1

Figure 7B:
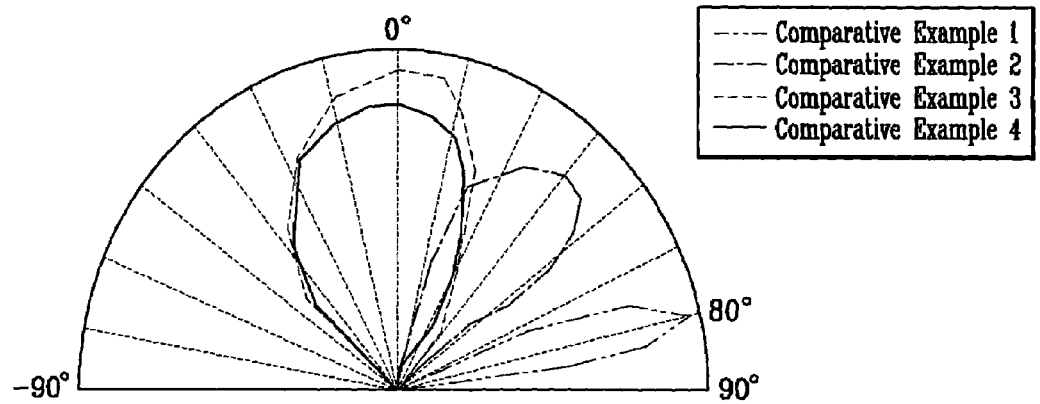

The experiment is applied to a backlight assembly provided with an LGP and without an optical sheet. Similar to a conventional LGP, a plurality of patterns are arranged on the bottom surface of the LGP. A profile of light is acquired from an experimental simulation. The experimental result is shown as the double dotted line in FIG. 7B. As shown in FIG. 7B, the light is emitted from the backlight assembly at a slanted angle of about 80°.

Comparative Example 2

The experiment is applied to a backlight assembly provided with an LGP and only a diffusion sheet as an optical sheet. Similar to a conventional LGP, a plurality of patterns are arranged on the bottom surface of the LGP. A profile of light is acquired from an experimental simulation. The experimental result is shown as the single dotted line in FIG. 7B. As shown in FIG. 7B, the light is emitted from the backlight assembly at a slanted angle of about 40°.

Comparative Example 3

The experiment is applied to a backlight assembly provided with an LGP and with optical sheets including of a diffusion sheet and a prism sheet. Similar to a conventional LGP, a plurality of patterns are arranged on the bottom surface of the LGP. A profile of light is acquired from an experimental simulation. The experimental result is shown as the dotted line in FIG. 7B. As shown in FIG. 7B, the light emitted from the backlight assembly is gathered at an angle of about 0°.

Comparative Example 4

The experiment is applied to a backlight assembly provided with an LGP and with optical sheets including of a diffusion sheet, a prism sheet, and a protection sheet. Similar to a conventional LGP, a plurality of patterns are arranged on the bottom surface of the LGP. A profile of light is acquired from an experimental simulation. The experimental result is shown as the solid line in FIG. 7B. As shown in FIG. 7B, the light emitted from the backlight assembly is gathered at an angle of about 0°. The brightness of the light according to Comparative Example 4 is less than the brightness of light according to Comparative Example 3 due to the protection film.

As described above, the brightness of the light is improved in the experimental examples of the present invention relative to the conventional comparative examples. The brightness of light emitted from the backlight assembly according to the present invention is improved by about 30% relative to the conventional backlight assembly.

In a conventional backlight assembly, a loss of light occurs while the light passes through the LGP and the optical sheets including a diffusing sheet, a prism sheet, and a protection sheet. On the contrary, in the backlight assembly of the present invention, the loss of light is less than occurs in the conventional backlight assembly because the light only passes through an LGP and a protection film coated on the LGP. Therefore, the present invention improves the brightness of light and reduces light loss. Further, the present invention increases a view angle, thereby improving image quality of the display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
   a light source for emitting light;
   a light guiding plate for guiding the light emitted from the light source, the light guiding plate having a light emitting surface and a bottom surface disposed opposite to the light emitting surface;
   a plurality of prism units arranged on the bottom surface of the light guiding plate;

a transparent film contacted with inclined surfaces of the prisms, and a reflection sheet disposed opposite the plurality of prisms with respect to the transparent film.

2. The backlight assembly of claim 1, wherein the plurality of prism units comprise a substantially circular shape.

3. The backlight assembly of claim 1, wherein the prism units are arranged on a protruding plate, the protruding plate being arranged on the bottom surface.

4. The backlight assembly of claim 1, wherein the light guiding plate has a lateral surface meeting the light emitting surface and the bottom surface, and the light source is disposed near the lateral surface.

5. The backlight assembly of claim 1, wherein each of the plurality of prisms has a first inclined surface and a second inclined surface, the first inclined surfaces of the prisms in each of the prism units are substantially parallel to each other, and the second inclined surfaces of the prisms in each of the prism units are substantially parallel to each other.

6. The backlight assembly of claim 1, wherein the plurality of prism units are spaced apart from each other.

7. The backlight assembly of claim 6, wherein the prism units spaced apart from each other by a distance greater than a distance between adjacent prisms within each of the prism units.

8. A display device, comprising:
a panel unit for displaying image; and
a backlight assembly including
a light source for emitting light;
a light guiding plate for guiding the light emitted from the light source, the light guiding plate having a light emitting surface and a bottom surface disposed opposite to the light emitting surface; and
a plurality of prism units arranged on a bottom surface of the light guiding plate, wherein each of the plurality of prism units comprises a plurality of prisms having peaks that become higher from an edge to a center of each of the plurality of prism units.

9. The display device of claim 8, wherein the plurality of prisms are arranged on a protruding plate, the protruding plate being formed on the bottom surface.

10. The display device of claim 8, wherein the prism units comprise a substantially circular shape.

11. The display device of claim 8, further comprising a protection film provided on the prism units.

12. The display device of claim 8, wherein the panel unit faces the light guiding plate.

13. The display device of claim 8, wherein the light guiding plate has a lateral surface meeting the light emitting surface and the bottom surface, and the light source is disposed near the lateral surface.

14. The display device of claim 8, wherein each of the plurality of prisms has a first inclined surface and a second inclined surface, the first inclined surfaces of the plurality of prisms in each of the plurality of prism units are substantially parallel to each other, and the second inclined surfaces of the prisms in each of the prism units are substantially parallel to each other.

15. The display device of claim 8, wherein the plurality of prism units are spaced apart from each other by a distance greater than a distance between adjacent prisms within each of the prism units.

16. The display device of claim 15, wherein the light emitting surface comprises a plurality of prisms arranged thereon.

17. The display device of claim 16, wherein the prisms on the light emitting surface cross the prisms on the bottom surface.

18. The display device of claim 17, wherein the prisms on the light emitting surface are arranged together to form at least one prism unit.

19. The display device of claim 18, wherein the plurality of prisms in each prism unit on the bottom surface are arranged in a single direction.

20. The display device of claim 19, wherein the prisms form a substantially right angle.

21. A display device, comprising:
a panel unit for displaying image; and
a backlight assembly including
a light source for emitting light;
a light guiding plate for guiding the light emitted from the light source, the light guiding plate having a light emitting surface and a bottom surface disposed opposite to the light emitting surface;
a plurality of prisms discontinuously arranged on the bottom surface of the light guiding plate along a longitudinal direction;
a transparent film contacted with inclined surfaces of the prisms, and
a reflection sheet disposed opposite the plurality of prisms with respect to the transparent film.

22. A backlight assembly, comprising:
a light source for emitting light;
a light guiding plate for guiding the light emitted from the light source, the light guiding plate having a light emitting surface and a bottom surface disposed opposite to the light emitting surface;
a plurality of prisms arranged on the bottom surface of the light guiding plate;
a transparent film contacted with inclined surfaces of the prisms, and
a reflection sheet disposed opposite the plurality of prisms with respect to the transparent film.

23. The backlight assembly of claim 1, wherein the prisms are arranged together to form a plurality of prism units, the plurality of the prism units being spaced apart from each other.

24. The backlight assembly of claim 22, wherein the plurality of prisms are spaced apart from each other.

25. The backlight assembly of claim 24, wherein the light emitting surface of the light guiding plate comprises a plurality of prisms arranged thereon.

26. The backlight assembly of claim 25, wherein an angle between reflecting sides of the prisms arranged on the light emitting surface form a substantially right angle.

27. The backlight assembly of claim 25, wherein the prisms arranged on the bottom surface are arranged along a longitudinal direction.

28. The backlight assembly of claim 25, wherein the prisms on the light emitting surface are arranged along a second direction that is different than the longitudinal direction such that the prisms on the light emitting surface cross the prisms arranged on the bottom surface.

* * * * *